United States Patent

[11] 3,601,419

[72] Inventor Alan G. Fern
Hatherley, Cheltenham, England
[21] Appl. No. 733,117
[22] Filed May 29, 1968
[45] Patented Aug. 24, 1971
[73] Assignee Dowty Seals Limited
Gloucester, England

[54] FLUID-PRESSURE-OPERATED PISTON-AND-CYLINDER DEVICE
9 Claims, 4 Drawing Figs.

[52] U.S. Cl. ............................................. 277/205,
277/143
[51] Int. Cl. ..................................................... F16j 15/32
[50] Field of Search ...................................... 92/168;
188/100 S; 74/18, 18.2; 277/165, 205, 169, 143, 144, 92

[56] References Cited
UNITED STATES PATENTS

| | | | |
|---|---|---|---|
| 3,109,661 | 11/1963 | Swaim et al. | 277/143 |
| 1,418,918 | 6/1922 | Hall | 277/143 |
| 3,003,799 | 10/1961 | Marchionda et al. | 277/205 X |
| 3,149,848 | 9/1964 | Galloway | 277/165 |

FOREIGN PATENTS

| | | | |
|---|---|---|---|
| 1,196,448 | 11/1959 | France | 277/165 |
| 1,346,683 | 11/1963 | France | 277/143 |
| 819,289 | 9/1959 | Great Britain | 277/205 |

Primary Examiner—Robert I. Smith
Attorney—Christensen & Sanborn

ABSTRACT: A ringlike sealing or wiping member is interposed between a pair of coaxially disposed but relatively slidably engaged cylindrical surfaces, one of which has a stepped contour thereon defining a pair of shoulders, the end walls of which are radially oppositely disposed about the cylindrical axis of the surfaces and spaced apart from one another by a circumferential recess in the one surface. In addition, one of the shoulders is spaced apart from the other of the surfaces, to form a radial clearance which allows for substantial relative radial movement therebetween. The ringlike member is interposed in the recess between the surfaces, and the main body of the member is yieldably biased along the axis of the surfaces in the direction of the radial clearance and the end wall of the one shoulder. The body has a continuously closed annular construction between the inner and outer peripheries thereof, and there are relatively flexible annular limbs on the inner and outer peripheral portions of the member which project from the main body of the same in the aforesaid direction of the bias thereon, and are spaced apart form one another at the ends thereof relatively remote from the body of the member, so that the limbs and body can flex in relation to one another. The end portion of one of the limbs is engaged with the end wall of the one shoulder, whereas the end portion of the other limb extends from the recess into the radial clearance between the surfaces and is engaged with the other surface thereof, in the clearance. There are also means including a space between the ringlike member and the end wall of the other shoulder, whereby the ringlike member is shiftable against the bias thereon.

PATENTED AUG 24 1971

INVENTOR
Alan G. Fern
BY
Christensen, Sanborn
and Matthews
ATTORNEY

INVENTOR
Alan G. Fern
BY
Christensen, Sanborn
and Matthews
ATTORNEY

FLUID-PRESSURE-OPERATED PISTON-AND-CYLINDER DEVICE

FIELD OF THE INVENTION

This invention relates to fluid-pressure-operated piston-and-cylinder devices.

In order to prevent leakage of liquid from a fluid-pressure-operated piston-and-cylinder device a sealing device or a bearing surface is used between the cylinder and the piston which is reciprocable with respect to the cylinder.

When such devices are operated in dirty conditions, such as on an earth-moving vehicle, dirt may be carried by the piston rod past the sealing device or the bearing surface, and this results in wear of the seal or of the surface with consequential faulty operation.

In order to protect the seal or the bearing surface against such damage, it is usual to employ a "scraper" or "wiper" ring between the seal and the outside of the cylinder. This scraper ring bears against the surface of the piston rod and removes dirt therefrom, so that the piston rod is clean when it reaches the seal or bearing surface.

It is an object of this invention to provide an improved fluid-pressure-operated piston-and-cylinder device.

SUMMARY OF THE INVENTION

This and other objects are realized by an arrangement of my invention wherein there are means such as the aforesaid device, defining a pair of coaxially disposed but relatively slidably engaged cylindrical surfaces, one of which has a stepped contour thereon defining a pair of shoulders, the end walls of which are radially oppositely disposed about the cylindrical axis of the surfaces and spaced apart from one another by a circumferential recess in the one surface. In addition, one of the shoulders is spaced apart from the other of the surfaces, to form a radial clearance which allows for substantial relative radial movement therebetween. To seal or wipe the arrangement, there is a ringlike member interposed in the recess between the surfaces, the main body of which is yieldably biased along the axis of the surfaces in the direction of the radial clearance and the end wall of the one shoulder. The body has a continuously closed annular construction between the inner and outer peripheries thereof, and there are relatively flexible annular limbs on the inner and outer peripheral portions of the member which project from the main body of the same in the aforesaid direction of the bias thereon, and are spaced apart from one another at the ends thereof relatively remote from the body of the member, so that the limbs and body can flex in relation to one another. The end portion of one of the limbs is engaged with the end wall of the one shoulder, whereas the end portion of the other limb extends from the recess into the radial clearance between the surfaces and is engaged with the other surface thereof, in the clearance. There are also means including a space between the ringlike member and the end wall of the other shoulder, whereby the ringlike member is shiftable against the bias thereon.

Preferably, the end wall of the other shoulder is closed, and there is a resilient biasing member such as a rubber or rubberlike O-ring, interposed in the space between the ringlike sealing or wiping member and the end wall of the other shoulder. The biasing member is annular in shape, and spaced apart from the other of the surfaces, to form a radial clearance therebetween; and the inner peripheral body portion of the ringlike member is spaced apart from the other of the surfaces, but engaged with the resilient biasing member in the latter said radial clearance therebetween.

In the presently preferred embodiments of the invention, the one shoulder is of different internal diameter than the other, and the ringlike member is shiftable in the recess along the axis of the surfaces. The resilient biasing member operates to bias the ringlike member along the axis of the surfaces, and the ringlike member has a base portion upon which the resilient biasing member bears, the two annular limbs extending divergingly from the base portion, with the aforesaid other limb projecting beyond the plane of the end wall of the one shoulder, into the radial clearance, and the dimensions of the clearance and the projecting portion of the other limb being such that the projecting portion is accommodated with freedom to permit substantial movement in the radial sense of one surface with respect to the other.

BRIEF DESCRIPTION OF THE DRAWINGS

Of the four accompanying drawings.

DESCRIPTION OF THE PREFERRED EMBODIMENTS

Figure 1:
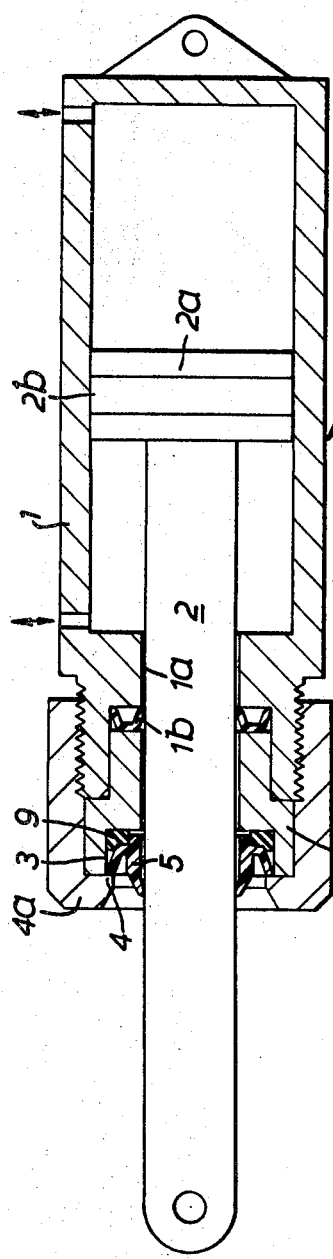
FIG. 1 is a diagrammatic part-cross-sectional view of a double-acting jack in accordance with a first embodiment of the invention.
Figure 2:
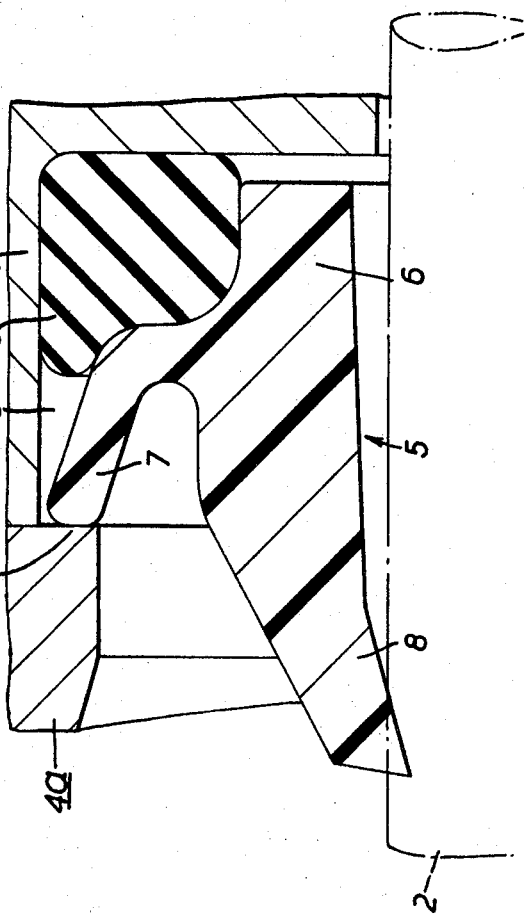
FIG. 2 is an enlarged view of a scraper ring assembly forming part of the construction shown in FIG. 1.

Referring to FIGS. 1 and 2 of the drawings, a hydraulically operated piston-and-cylinder device in the form of a double-acting telescopic jack $S_1$ includes a cylinder 1, which as shown in FIG. 1 is closed at its right-hand end portion and which houses a ram, reciprocable therein, which comprises a piston rod 2 integrally formed with a piston 2a. The piston rod 2 extends to the left in FIG. 1 through a cylinder aperture 1a, a gland 1b, a bearing 1c and a scraper ring assembly (described in detail below) to the exterior of the cylinder.

The piston 2a is provided with a conventional sealing ring 2b mounted in a suitable groove around its periphery.

An open-ended housing 3 is provided at the left-hand end portion of the bearing 1c which surrounds the piston rod 2. A shoulder 4 formed on a screw-threaded end cap 4a is positioned at the entrance to the housing and an annular scraper ring 5 is provided in the housing. This scraper ring has a base portion 6 and two limbs 7 and 8 extending from the base portion. These limbs diverge away from each other generally in the direction of the axis of the cylinder. The assembly also includes a resilient member 9, in the form of an O-ring positioned between the housing 3 and the ring 5.

The axial length from the end of the limb 8 to the base of the ring is greater than axial length from the end of the limb 7 to the base of the ring.

Since in this embodiment the annular ring 5 is to act as a scraper ring, it may be of a hard plastics material, for example, an acetal resin or a polyamide, and the resilient member 9 is, conveniently, rubber.

In use, the dimensions of the ring 5 and of the housing 3 are such that the resilient member 9 urges the ring 5 away from the closed end of the housing, so that there is a gap between the end of the ring and the closed end or base of the housing, so that the limb 7 engages the shoulder 4, and the outermost end of the limb 8 bears against the piston rod 2. In this way a scraping action upon the piston rod is performed effectively to maintain the exterior surface of the rod free from the adhesion thereto of foreign matter. Furthermore, the dimensions and the arrangement of the various parts are such that the ring 5 can "float" in the housing and thus it will not only accommodate any lack of concentricity between the piston rod and the cylinder, but will also allow contact to be maintained between the piston rod and the ring if tipping of the piston rod occurs.

The resilient member 9 not only energizes the ring, but it also acts as a seal at the back of the ring.

Alternatively, instead of acting as a scraper ring, the annular ring may act as a sealing ring and in this case it will be made from any material suitable for that purpose. The ring will here form a sealing action.

Whether the ring is performing a scraping action or a sealing action, the scraping or sealing force is directed on a line through the scraping or sealing edge of the ring towards the center of the cross section of the resilient member. Thus shock loads and impact forces at the edge are transmitted to, and absorbed by, the resilience of the member.

Figure 3:
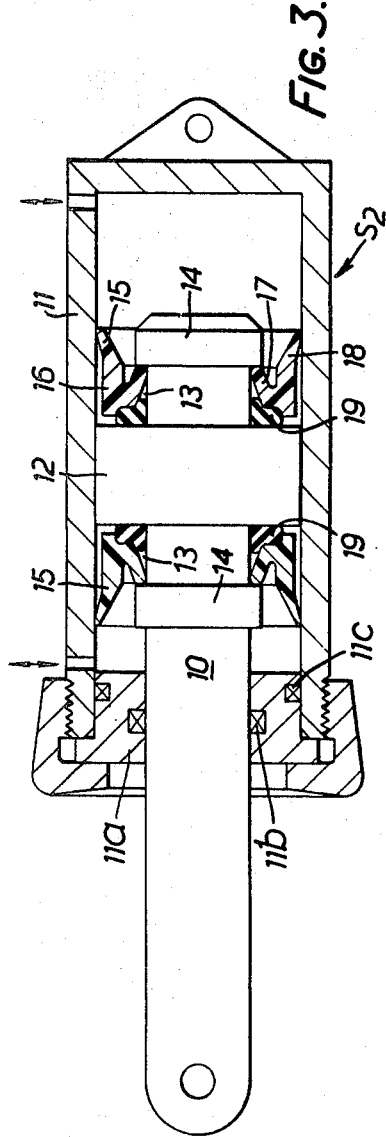
FIG. 3 is a diagrammatic part-cross-sectional view of a double-acting jack in accordance with a second embodiment of the invention, and, FIG. 4 is an enlarged view of a sealing ring assembly forming part of the construction shown in FIG. 3.
Figure 4:
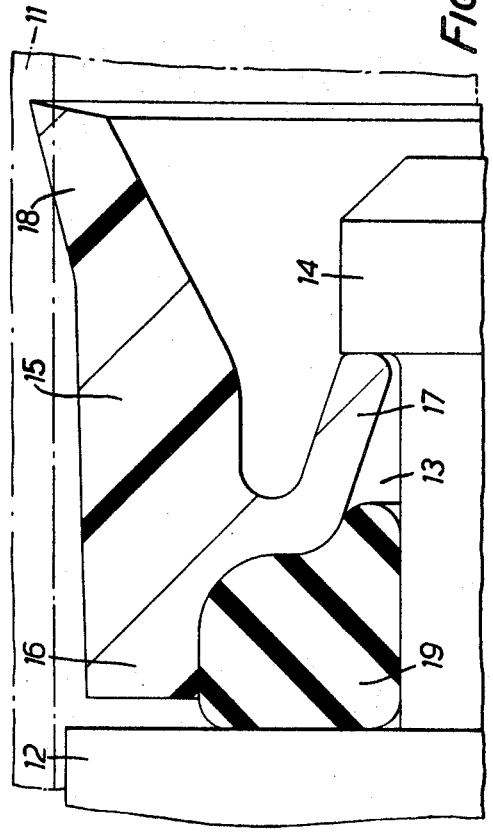

With reference to FIGS. 3 and 4 of the accompanying drawings, a hydraulically operated piston-and-cylinder device in accordance with the second embodiment takes the form of a double-acting telescopic jack $S_2$, which as shown in FIG. 3, includes a piston rod 10, a cylinder 11 and a piston 12 formed integrally with the piston rod and reciprocable therewith in the cylinder.

The right-hand end portion of the cylinder 11 is closed and the piston rod 10 extends to the exterior of the jack through an apertured member 11a, which is secured in the manner shown with respect to the cylinder 11, and which incorporates sealing rings 11b and 11c.

The piston rod 10 is provided with two shoulders 14, and between these shoulders and the piston 12 are provided two sealing assemblies 15/19 arranged back to back.

That sealing assembly 15/19 to the right of the piston 12 in FIG. 3 is shown in enlarged detail in FIG. 4. The recess 13 formed between the piston 12 and the shoulder 14 carries an annular sealing ring 15 which has a base portion 16 and two limbs 17 and 18 extending from the base portion. The two limbs diverge away from each other generally in the direction of the axis of the cylinder. A resilient member 19, in the form of an O-ring is positioned between the ring 15 and the housing 13.

In use, the dimensions of the ring and of the housing are such that the resilient member 19 urges the ring 15 away from an end of the housing so that there is a gap between the end of the ring and that end of the housing, so that the limb 17 engages the shoulder 14, and the outermost end of the limb 18 bears against the cylinder 11 so as to perform a sealing function.

As in the embodiment above-described with reference to FIGS. 1 and 2 of the drawings, the dimensions and the arrangement of the various parts in this embodiment are such that the two rings 15 can "float" in their respective housing 13.

In both of the above-described embodiments the resilient members are in the form of O-rings, but in other embodiments they could be, for example, an elastomeric material of other than O-section.

It will be appreciated that this invention provides a scraper ring and/or a sealing ring for a hydraulically operated piston-and-cylinder device, which ring is associated with the housing, is resiliently energized and is capable of moving ("floating") in the housing to accommodate movement of the piston which is in a direction other than the axial of the device.

The invention is in no way limited to double-acting telescopic jacks, as in other embodiments it may with advantage be applied to single-acting jacks.

Again, the invention is in no way limited in its application to jacks or similar devices of the hydraulic type, as in other embodiments it is with advantage applied to jacks or similar devices of the gaseous fluid-pressure-operated type, for example pneumatically powered jacks.

Further, the invention is in no way limited to the scraper ring/sealing ring arrangements disclosed with reference to the drawings, as in other embodiments other arrangements may with advantage be provided, for example, the construction of FIG. 3 may be modified so that additionally the sealing ring 11b is instead constructed in accordance with the assembly shown in FIG. 2, while again for example, the construction of FIG. 1 may be modified so that additionally the sealing ring 2b is instead constructed in accordance with the assembly shown in FIG. 3.

Finally, the invention is in no way limited to having an annular ring comprising a base portion and two limbs, as in other embodiments rings of other suitable cross-sectional shape affording the desired sealing and/or scraping characteristics may instead be provided, for example, the annular ring may have no limbs but be so shaped that one edge portion seats in the housing, a face thereof is in contact with the resilient member and another edge portion thereof engages the piston, the piston rod, the cylinder, or a bearing in the cylinder, as the case may be.

I claim:

1. In combination, means defining a pair of coaxially disposed but relatively slidably engaged cylindrical surfaces, one of which has a stepped contour thereon defining a pair of shoulders, the end walls of which are radially oppositely disposed about the cylindrical axis of the surfaces and spaced apart from one another by a circumferential recess in the one surface, one of said shoulders being spaced apart from the other of the surfaces, to form a radial clearance which allows for substantial relative radial movement therebetween, and there being a ringlike member interposed in the recess between the surfaces, the main body of which is yieldably biased along the axis of the surfaces in the direction of the radial clearance and the end wall of the one shoulder, and has a continuously closed annular construction between the inner and outer peripheries thereof, there being relatively flexible annular limbs on the inner and outer peripheral portions of the ringlike member which project from the main body of the same in the aforesaid direction of the bias thereon, and are spaced apart from one another at the ends thereof relatively remote from the body of the member, so that the limbs and body can flex in relation to one another, the end portion of one of which limbs is engaged with the end wall of the one shoulder, whereas the end portion of the other limb extends from the recess into the radial clearance between the surfaces and is engaged with the other surface thereof, in the clearance, and means including a space between the ringlike member and the end wall of the other shoulder, whereby the ringlike member is shiftable against the bias thereon.

2. The combination according to claim 1 wherein the surfaces are relatively slidable along the cylindrical axis thereof.

3. The combination according to claim 1 wherein the end wall of the other shoulder is closed, and there is a resilient biasing member interposed in the space between the ringlike member and the end wall of the other shoulder.

4. The combination according to claim 3 wherein the resilient biasing member takes the form of a rubber or rubberlike O-ring.

5. The combination according to claim 3 wherein the resilient biasing member is annular in shape, and spaced apart from the other of the surfaces, to form a radial clearance therebetween.

6. The combination according to claim 5 wherein the inner peripheral body portion of the ringlike member is spaced apart from the other of the surfaces, but engaged with the resilient biasing member in the latter said radial clearance therebetween.

7. In combination, means defining a pair of coaxially disposed but relatively slidably engaged cylindrical surfaces, one of which has a stepped contour thereon defining two shoulders, the end walls of which are radially oppositely disposed about the cylindrical axis of the surfaces and spaced apart from one another by a circumferential recess in the one surface, one of said shoulders being of different diameter than the other, whereby a substantial radial clearance is formed between said one shoulder and the other of said surfaces, and there being a ringlike member interposed in the recess between the surfaces, means including a space between the ringlike member and the end wall of the other of said shoulders, whereby the ringlike member is shiftable in the recess along the axis of the surfaces, and a resilient biassing member being interposed in said space, yieldably to bias the ringlike member along the axis of the surfaces in the direction of the end wall of said one shoulder, said ringlike member having a base portion upon which said resilient biassing members bears and two annular limbs which divergingly extend from said base portion, one limb being engaged at its free end portion with the end wall of said one shoulder, and the other limb projecting beyond the plane of that wall into said radial clearance, being engaged at its free end portion with the other of the surfaces, the dimensions of said radial clearance and of the projecting portion of said other limb disposed in that clearance being such that said projecting portion is accommodated in said clearance with freedom to permit substantial movement in the radial sense of one surface with respect to the other.

8. The combination according to claim 7 wherein the resilient biasing member is annular in shape, and spaced apart from the other of the surfaces, to form a radial clearance therebetween.

9. The combination according to claim 7 wherein the resilient biasing member takes the form of a rubber or rubber-like O-ring.